US006933689B2

(12) United States Patent
Yamamoto

(10) Patent No.: US 6,933,689 B2
(45) Date of Patent: Aug. 23, 2005

(54) POWER TOOLS

(75) Inventor: Hirokatsu Yamamoto, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/423,226

(22) Filed: Apr. 25, 2003

(65) Prior Publication Data

US 2003/0201738 A1 Oct. 30, 2003

(30) Foreign Application Priority Data

Apr. 26, 2002 (JP) ....................................... 2002-126908

(51) Int. Cl.[7] ............................ H02P 1/00; H02P 3/00; H02P 5/00

(52) U.S. Cl. ....................... 318/139; 318/432; 318/434; 173/178; 173/181

(58) Field of Search ................................ 318/139, 430, 318/432, 434, 254, 439, 178, 181; 173/178, 181, 217

(56) References Cited

U.S. PATENT DOCUMENTS 3,847,233 A * 11/1974 Glover et al. ............... 173/170
3,952,239 A * 4/1976 Owings et al. ............. 320/113
4,267,914 A * 5/1981 Saar ........................... 192/147
5,738,177 A * 4/1998 Schell et al. ................ 173/178
6,296,065 B1 * 10/2001 Carrier ....................... 173/217
6,431,289 B1 * 8/2002 Potter et al. .................. 173/47
6,446,734 B1 * 9/2002 Williams et al. ............... 173/1
6,460,626 B2 * 10/2002 Carrier .......................... 173/1
6,536,536 B1 * 3/2003 Gass et al. ...................... 173/2
6,729,413 B2 * 5/2004 Turner et al. ............... 173/217
6,729,414 B2 * 5/2004 Cooper et al. .............. 173/217
6,749,028 B1 * 6/2004 Chan et al. ................. 173/170
2002/0020539 A1 * 2/2002 Driessen ..................... 173/216

FOREIGN PATENT DOCUMENTS

| | | |
|---|---|---|
| JP | 08-329991 | 12/1996 |
| JP | 09-028045 | 1/1997 |

* cited by examiner

*Primary Examiner*—David Martin
*Assistant Examiner*—Tyrone Smith
(74) *Attorney, Agent, or Firm*—Orrick Herrington & Sutcliffe LLP

(57) ABSTRACT

It is an object of the invention to provide a technique to effectively prevent a power tool from being adversely affected when a battery is removed from the power tool. According to the present invention, a power tool is provided that includes a tool bit, a motor that drives the tool bit, a body that houses the motor, a battery detachably coupled to the body so as to supply driving current to operate the motor, and a battery removal preventing device. Within the power tool, the battery removal preventing device prevents the battery from being removed from the body during operation of the motor and allows the battery to be removed from the body only when the motor is stopped. As a result, arc can be effectively prevented from being generated between the battery and the body of the power tool.

22 Claims, 6 Drawing Sheets

POWER TOOLS

BACKGROUND OF THE INVENTION

1. Field of the Invention

The present invention relates to a power tool driven by a battery and more particularly, to a power tool that can prevent an arc between the body of the power tool and the battery when the battery is detached from the body during operation.

2. Description of the Related Art

According to a known power tool driven by a battery, the battery supplies driving current to a motor in order to drive a tool bit. For example, a known screwdriver includes a body having a motor housing and a hand grip, and a battery detachably coupled to the body. The motor housing includes the motor for driving the driver bit. The hand grip is connected to the motor housing. The battery is detachably coupled to the lower end portion of the hand grip. The battery is defined as one element of a power circuit to drive the motor by means of a connecting terminal. Thus, the battery supplies driving current to the motor via the power circuit.

Within the known power tool, because the battery is detachably coupled to the body, user of the power tool may unintentionally remove the battery from the body during the operation. The battery defines one element of the motor driving power circuit via a connecting terminal and the battery supplies driving current to the motor during its operation. Therefore, when the battery is removed from the body during the operation of the power tool, the power circuit may possibly be interrupted abruptly. When the power circuit for driving the motor is interrupted during the operation of the motor, arc may be generated at the contacts between the body of the power tool and the battery. Arc may adversely affect corrosion-resistance of the power tool.

SUMMARY OF THE INVENTION

It is, accordingly, an object of the invention to provide a technique to effectively prevent a power tool from being adversely affected when a battery is removed from the power tool.

According to the present invention, a power tool is provided that includes a tool bit, a motor that drives the tool bit, a body that houses the motor, a battery detachably coupled to the body so as to supply driving current to operate the motor, and a battery removal preventing device. Within the power tool, the battery removal preventing device prevents the battery from being removed from the body during operation of the motor and allows the battery to be removed from the body only when the motor is stopped. As a result, arc can be effectively prevented from being generated between the battery and the body of the power tool.

Other objects, features and advantages of the present invention will be readily understood after reading the following detailed description together with the accompanying drawings and the claims.

DETAILED DESCRIPTION OF THE INVENTION

Figure 1:
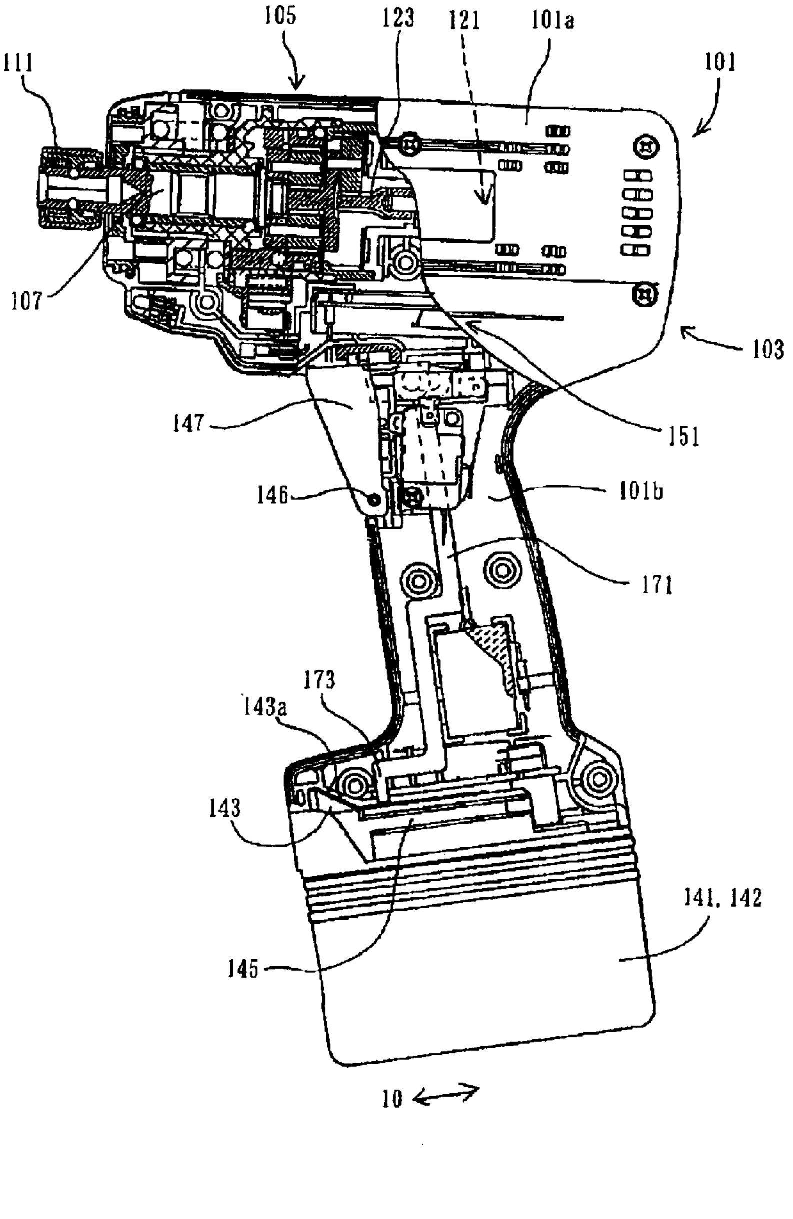
FIG. 1 shows an electric screwdriver according to a first embodiment of the invention.

According to the present invention, a representative battery-type power tool is provided. The representative power tool may include a tool bit, a motor, a body, a battery and a battery removal preventing device. The motor drives the tool bit. The body houses the motor. The battery is detachably coupled to the body so as to supply driving current to operate the motor.

The battery removal preventing device according to the present invention is adapted and arranged to prevent the battery from being removed from the body during operation of the motor and to allow the battery to be removed from the body only when the motor is stopped. In the present teachings, to "prevent the battery from being removed from the body" widely embraces not only preventing the battery from being removed completely from the body, but preventing the state in which the battery is incompletely mounted on the body. In other words, the present teachings may embrace preventing an improperly mounted state or the state in which actually the battery is not properly mounted onto the body even though outwardly it looks properly mounted thereon.

According to the present teachings, the battery is prevented from being removed from the body during operation of the motor, while the battery is allowed to be removed from the body only when the motor is stopped. As a result, arc can be prevented from being generated at the connecting terminal between the battery and the body. Thus, the improved power tool can be used in an explosion-proof condition.

In the present teachings, "only when the motor is stopped" is related to the state in which the motor is actually stopped regardless of the operating conditions. For example, the feature of "only when the motor is stopped" does not embrace the state in which the motor is actually being driven while the trigger switch is released. In such a state, because the motor is not stopped, the battery is not allowed to be removed from the body. The state in which the battery is "allowed" to be removed from the body widely embraces not only the state in which the battery removal preventing device positively assists in removing the battery from the body, but also the negative state in which the battery removal preventing device does not obstruct other means removing the battery from the body.

In the present teachings, the "tool bit" widely embraces any tools such as drills, grinders, impact drivers, impact wrenches, cutters, trimmers, circular saws or reciprocating saws. The motor for driving the tool bit typically comprises a DC motor or a DC brushless motor. Preferably, the body may have a motor housing and a hand grip. In this case, the battery may preferably be coupled to the motor housing or to the hand grip. A rechargeable battery may typically be utilized.

According to the present teachings, the battery removal preventing device may preferably include a battery lock. The battery lock may detachably lock the battery to the body. The battery lock may be adapted to lock the battery to the body when the motor is started and to release the lock between the battery and the body only when the motor is stopped. With such a construction, the battery can be automatically locked or released by interlocking with the operation of the motor. Further, the battery is allowed to be removed from the body only when the motor is stopped. Therefore, the possibility that the battery might be removed from the body during the operation of the motor can be securely eliminated without requiring unnecessary burden to the user of the power tool. As a result, generation of arc can be effectively prevented.

In order to lock and release the battery in relation to the operation of the motor, for example, the locking and releasing movements of the battery may preferably be interlocked with the operational movement (e.g., turning on and off of the trigger switch) of the trigger switch of the power tool. Otherwise, the locking and releasing movements of the battery may preferably be performed based on the detection of the current for driving the motor. Further, "to lock the battery to the body" in the present teachings embraces both the manner of locking the battery to the body with a battery lock provided on the body side and the manner of locking the battery to the body with a battery lock provided on the battery side. The lock may be mounted either in the inner portion or the outer portion of the body or the battery. Further, in order to lock the battery to the body, for example, if the battery is mounted onto the body by sliding contact with the body, the sliding points may preferably be locked. Otherwise, if the battery is engaged on the body by using a hook, the hook may be locked, or the hook may be covered with a shutter so as to block the use's access.

As one aspect of the present invention, the power tool may preferably include a trigger switch that is operated to start and stop the motor. Further, the battery removal preventing device may preferably include a battery lock for removably locking the battery to the body and a trigger switch interlocking member that transmits the operational movement of the trigger switch to the battery lock in order to operate the battery lock. The battery lock may be adapted to lock the battery to the body via the trigger switch interlocking member when the trigger switch is operated to start the motor and to release the lock between the battery and the body via the trigger switch interlocking member only when the trigger switch is operated to stop the motor.

Because the battery can be locked to and released from the body by interlocking with the operation of the trigger switch, and the engagement (locking) between the battery and the body can be released only when the motor is actually stopped, the battery can be automatically locked and released simply by operating the trigger switch of the power tool. Further, the possibility that the battery might be removed from the body can be reliably eliminated even under the condition in which the motor is not stopped even if the trigger switch outwardly looks released. As a result, generation of arc can be effectively prevented. The trigger switch interlocking member widely embraces a mechanically transmitting device, such as a link, which mechanically transmits the movement of the trigger switch when the trigger switch is operated. Further, the trigger switch interlocking member also embraces a transmitting device that dynamically operates the battery lock by utilizing fluid pressure according to the operation of the trigger switch, or an electrically operated transmitting device.

As one aspect of the present invention, the battery removal preventing device may preferably include a battery lock for locking the battery to the body and a control device that outputs a lock signal and/or a lock release signal to the battery lock in accordance with the operating state of the motor. The battery lock may be adapted to lock the battery to the body based on the lock signal outputted from the control device when the motor is started. Further, the battery lock may be adapted to release the locking engagement between the battery and the body based on the lock release signal outputted from the control device only when the motor is stopped.

Because the control device outputs a lock signal or a lock release signal to the lock based on the operating state of the motor, the battery can be automatically locked or released by interlocking with the control of the operation of the motor. Further, the battery is allowed to be removed from the body only when the motor is actually stopped. Therefore, the possibility that the battery might be removed from the body during operation of the motor can be reliably eliminated without requiring unnecessary burden to the user of the power tool. As a result, generation of an arc can be effectively prevented. The battery lock may preferably be defined by an electrically controlled lock mechanism such as a solenoid because the battery lock is operated by receiving a lock signal and/or a lock release signal.

According to one aspect of the present teachings, a power tool may include a tool bit, a motor that drives the tool bit, a body that houses the motor, a battery detachably coupled to the body, wherein the battery supplies driving current to operate the motor, an attaching device that removably attaches the battery to the body and a battery removal preventing device. The battery removal preventing device may prevent the battery attached to the body by means of the attaching device from being released when the motor is started. Further, the battery removal preventing device may allow the battery attached to the body by means of the attaching device to be released when the motor is stopped. In the present teachings, the removal of the battery during operation of the motor can be prevented via the attaching device of the battery, so that generation of an arc can be prevented. According to this teaching, it is not necessary to directly provide a lock mechanism onto the battery unit and thus, the freedom of design can be increased.

The terms of "attaching" and "attaching device" widely embraces various manners of connecting the battery to the body. Specifically, it embraces not only engaging the battery firmly onto the body, but also a connecting manner in which it makes difficult or impossible to detach the battery from the body unless the attaching device disposed between the battery and the body is released. As an attaching device, for example, a battery cover that covers the battery or an adapter that is disposed between the battery and the body may be suitably used.

Each of the additional features and method steps disclosed above and below may be utilized separately or in conjunction with other features and method steps to provide improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

(First Embodiment)

FIG. 1 shows a representative electric screwdriver 101 according to the present invention. The screwdriver 101 is a feature that corresponds to one example of the "power tool" according to the present invention. The screwdriver 101 may include a motor housing 101*a* and a grip 101*b*. The motor housing 101*a* houses a DC brushless motor 121, a motor drive shaft 123, a speed change mechanism 105 and a spindle 107. The speed change mechanism 105 includes planetary gears. A bit mounting chuck 111 is mounted to the end of the spindle 107. The motor housing 101*a* and the grip 101*b* define a body 103 of the screwdriver 101. Although it is not particularly shown for the sake of convenience, a driver bit for screw tightening is attached to the bit mounting chuck 111. The driver bit is a feature that corresponds to the "tool bit" according to the present invention.

A trigger switch 147 is provided on the upper end portion of the grip 101*b*. A battery pack 142 having a battery 141 is removably mounted on the lower end portion of the grip 101*b*.

The trigger switch 147 is operated by turning about an axis of rotation 146 provided in the lower end portion of the switch 147. The battery 141 is contained within the battery pack 142 that functions as battery housing. The battery 141 and the battery pack 142 are features that correspond to the "battery" according to the present invention. An engagement device 143 and a mounting guide 145 are disposed on the top of the battery pack 142. The engagement device 143 retractably protrudes upward from the battery pack 142 by operating an engagement device operating part which is not shown. The mounting guide 145 serves to guide the battery pack 142 when mounting the battery pack 142 on the lower end portion of the grip 101*b* by sliding the battery pack 142 in the direction shown by an arrow 10. Further, the mounting guide 145 also serves to prevent the battery pack 142 from dropping down from the grip 101*b*.

In order to mount the battery pack 142 on the lower end portion of the grip 101*b*, the battery pack 142 is pushed forward in the mounting direction 10 while being guided by the mounting guides 145. At this time, an inclined surface 143*a* of the engagement device 143, which surface faces forward in the mounting direction 10, is pressed against the bottom of the grip 101*b*. As a result, the engagement device 143 retracts into the battery pack 142, thereby allowing the battery pack 142 to be further pushed forward in the mounting direction 10. When the battery pack 142 is properly mounted on the grip 101*b*, the engagement device 143 protrudes into the grip 101*b*, so that the battery pack 142 is engaged with the grip 101*b*. In other words, the battery pack 142 is prevented from sliding in the reverse direction and thus being removed from the body 103.

Figure 2:
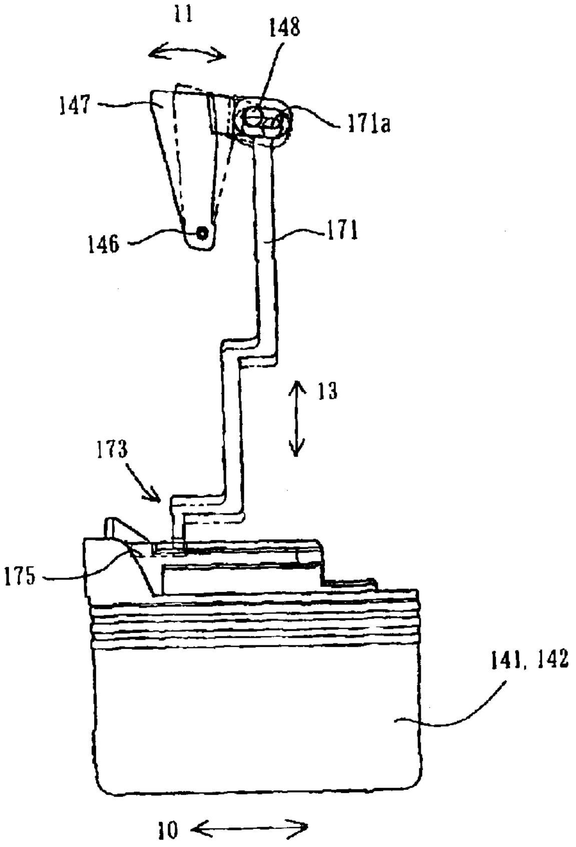
FIG. 2 shows the structure of a trigger switch, a trigger switch interlocking member, a battery lock and a battery pack which are utilized within the first embodiment.

The trigger switch 147 is connected to a trigger switch interlocking member 171 and a lock 173. FIG. 2 shows the structure of the trigger switch 147, trigger switch interlocking member 171, lock 173, battery pack 142 and battery 141. The lock 173 is a feature that corresponds to the "lock device" and "battery lock" according to the present invention. The trigger switch 147 pivots about the axis of rotation 146 in the direction shown by arrow 11 in FIG. 2. A cam pin 148 is integrally formed with the trigger switch 147 on the rear of the trigger switch 147. The cam pin 148 swings in the direction 11 by interlocking with the operational movement of the trigger switch 147. A cam groove 171*a* is formed in the upper end portion of the trigger switch interlocking member 171 and receives the cam pin 148. The lock 173 is provided on the lower end portion of the trigger switch interlocking member 171. The cam pin 148 and the cam groove 171*a* cooperate to cause the trigger switch 147 to rotate about the axis of rotation 146 in the direction 11. At the same time, in response to the operational movement of the trigger switch 147, the trigger switch interlocking member 171 moves linearly in the vertical direction shown by arrow 13. The vertical movement of the trigger switch interlocking member 171 allows the lock 173 to retractably protrude into the battery pack 142.

A lock engagement recess 175 for receiving the lock 173 is formed in the upper surface of the battery pack 142. When the trigger switch 147 is thrown, the trigger switch interlocking member 171 linearly moves downward so that the lock 173 is received in the lock engagement recess 175 of the battery pack 142. The battery pack 142 is thus locked during the throwing of the trigger switch 147 by the lock 173 being engaged in the lock engagement recess 175. Therefore, the battery pack 142 cannot be moved in the direction 10 to be removed from the body 103. The battery pack 142 (and the battery 141) is prevented from being removed from the body 103 during the throwing (switch-on) of the trigger switch 147.

On the other hand, when the trigger switch 147 is released, the trigger switch interlocking member 171 and the lock 173 moves upward so that the lock 173 is disengaged from the lock engagement recess 175. As a result, the battery pack 142 (the battery 141) is allowed to move in the direction 10 and thus to be removed from the body 103.

Figure 3:
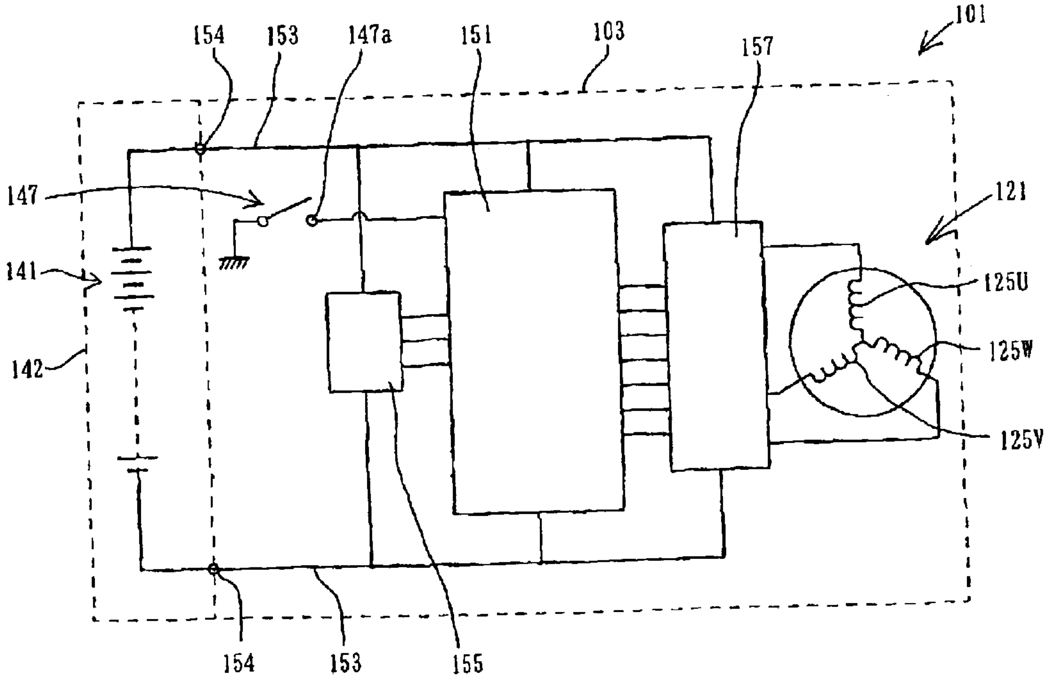
FIG. 3 shows a circuit structure of the screwdriver according to the first embodiment.

FIG. 3 shows a circuit structure for driving the DC brushless motor 121 within the screwdriver 101 according to the representative embodiment. The screwdriver 101 mainly comprises a control circuit 151 to control the operation of the DC brushless motor 121, a power circuit 153 for supplying driving current from the battery 141 to the DC brushless motor 121, a position detecting circuit 155 and an FET bridge 157. These components are disposed within the body 103. The battery 141 contained in the battery pack 142 is electrically connected to the power circuit 153 in the body 103 via a connecting terminal 154. The control circuit 151 is a feature that corresponds to the "control device" according to the present invention.

The DC brushless motor 121 is connected to the battery 141 via the connecting terminal 154 and the power circuit 153 in order to receive the supply of the driving current. Further, the motor 121 is connected to the control circuit 151 and the FET bridge 157 that is connected to the control circuit 151 in order for the driving control. The DC brushless motor 121 is driven by means of a three-phase bipolar driving circuit.

Although it is not particularly shown, six FETs (field-effect transistors) are provided within the FET bridge 157 for rectangular wave driving of the DC brushless motor 121. The FETs are connected to three coils (armature winding) 125U, 125V, 125W for driving a rotor (not particularly shown in the drawings) of the DC brushless motor 121. The coils 125U, 125V, 125W are drivingly controlled based upon 120° energizing rectangular wave by selectively applying a voltage to the respective gates of the FETs.

The position detecting circuit 155 includes Hall elements and is connected to the control circuit 151. The position detecting circuit 155 detects the rotating positions of the rotor of the DC brushless motor 121 and outputs a rotor position signal to change the phase sequence in supplying the motor driving signals to the respective coils 125U, 125V, 125W in accordance with the respective phases (energizing start timing).

The trigger switch 147 is electrically connected to the control circuit 151 independently of the power circuit 153. The trigger switch 147 according to this embodiment is not designed to directly connect or disconnect the power circuit 153 by connecting or disconnecting a switch contact 147*a*. The trigger switch 147 is designed to produce or release a triggering signal with respect to the control circuit 151 by connecting or disconnecting the switch contact 147*a*. The control circuit 151 then connects or disconnects the power circuit 153 according to the presence or absence of the triggering signal. The trigger switch 147 according to this embodiment is designed such that a current passes only in necessary and sufficient amount to produce a triggering signal. The trigger switch 147 is not designed such that a large current passes through the power circuit 153 to drive the DC brushless motor 121.

Although it is not particularly shown in the drawings, the connecting terminal 154 that electrically connects the power circuit 153 in the body 103 to the battery 141 includes a female-type battery-side terminal and a male-type body-side terminal that can be fitted into the battery-side terminal. The connecting terminal 154 may have a male-type battery-side terminal and a female-type body-side terminal.

Operation of the electric screwdriver 101 according to the representative embodiment will now be explained. When a user of the screwdriver 101 operates the trigger switch 147 of the screwdriver 101 as shown in FIG. 1, the trigger switch 147 turns clockwise as viewed in FIG. 1 about the axis of rotation 146. As a result, the DC brushless motor 121 is driven by means of the battery 141. The rotational movement of the DC brushless motor 121 is transmitted from the motor drive shaft 123 to the speed change mechanism 105, and then to the spindle 107 while being appropriately decelerated by the speed change mechanism 105. When the spindle 107 is thus rotated by the motor 121, the driver bit (not shown) coupled to the bit mounting chuck 111 on the front end of the spindle 107 is also rotated. Thus, the screw tightening operation is performed.

When the trigger switch 147 is thrown (turned on) to perform the screw tightening operation, as mentioned above, the trigger switch interlocking member 171 as shown in FIG. 2 linearly moves downward by interlocking with the operation of the trigger switch 147. Thus, the lock 173 is received in the lock engagement recess 175 of the battery pack 142. Therefore, the lock 173 is held engaged in the lock engagement recess 175 when the DC brushless motor 121 is being driven by operation of the trigger switch 147. Thus, the battery pack 142 is prevented from being removed from the body 103.

On the other hand, when the trigger switch 147 is released to stop the DC brushless motor 121, the trigger switch interlocking member 171 and the lock 173 move upward by interlocking with the release of the trigger switch 147. The lock 173 is then disengaged-from the lock engagement recess 175. As a result, only when the DC brushless motor 121 is stopped by operation of the trigger switch 147, the battery pack 142 (the battery 141) is allowed to move in the direction 10 and thus to be removed from the body 103. In other words, according to this embodiment, the possibility of producing arc at the connecting terminal 154 when the battery 141 is removed from the body 103 during operation of the DC brushless motor 121 can be eliminated as much as possible.

In this embodiment, the trigger switch 147 does not directly connect and disconnect the power circuit 153. The control circuit 151 connects or disconnects the power circuit 153 independently of the trigger switch 147 by producing a triggering signal when the trigger switch 147 is thrown to connect the switch contact 147*a* or by releasing the triggering signal. As a result, a large current for driving the DC brushless motor 121 does not pass through the switch contact 147*a*. Therefore, the switch contact 147*a* can be prevented from being welded by overheating, and thus, the power circuit 153 can be prevented from being connected all the time regardless of the operation of the trigger switch 147. Thus, the possibility of producing arc at the connecting terminal 154 when the battery 141 is removed from the body 103 during supply of the driving current through the power circuit 153 can be eliminated.

This representative embodiment can eliminate the possibility that a large current passes through the power circuit 153 and thus, the switch contact 147*a* is welded due to overheat. According to this embodiment, because the DC brushless motor 121 can be reliably started and stopped by operation of the trigger switch 147, arc can be prevented from being generated at the connecting terminal 154 between the battery 141 and the body 103.

When the battery pack 142 is mounted on the grip 101*b* again after it is once removed, the battery pack 142 may possibly be incompletely engaged on the grip 101*b*. In such a case, the lock 173 as shown in FIG. 2 may not be aligned on the lock engagement recess 175 so that the lock 173 cannot be engaged in it. In this case, the upper surface of the battery pack 142 blocks the downward movement of the lock 173 and the trigger switch interlocking member 171 from the position shown in solid line to the position shown in broken line where the battery pack 142 is locked. As a result, the trigger switch 147 coupled to the trigger switch interlocking member 171 cannot be activated. Therefore, the user of the screwdriver 101 can promptly notice improper mounting of the battery pack 142.

Figure 4:
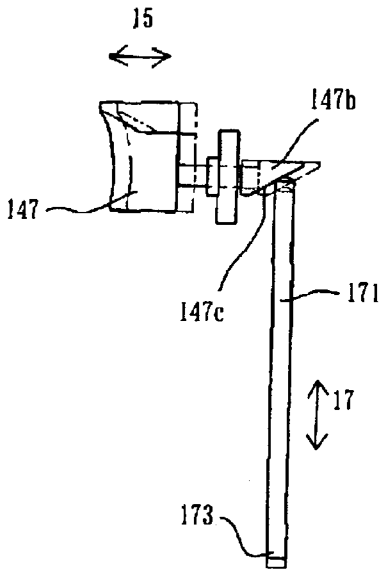
FIG. 4 shows an example of modification of the interlocking mechanism for interlocking the trigger switch and the lock according to the first embodiment.

FIG. 4 shows a modified interlocking mechanism for interlocking the trigger switch 147 and the lock 173. This interlocking mechanism includes a cam 147*b* having an inclined surface 147*c*, the trigger switch interlocking member 171 and the lock 173. As shown in FIG. 4, when the trigger switch 147 moves horizontally in the direction as shown by arrow 15, the cam 147*b* moves horizontally by interlocking with the movement of the trigger switch 147. The trigger switch interlocking member 171 is held in contact with the inclined surface 147*c* of the cam 147*b* and it moves vertically in the direction as shown by arrow 17 when the trigger switch 147 moves horizontally. The lock 173 is coupled to the lower end of the trigger switch interlocking member 171 and moves vertically together with the trigger switch interlocking member 171.

(Second Embodiment)

Figure 6:
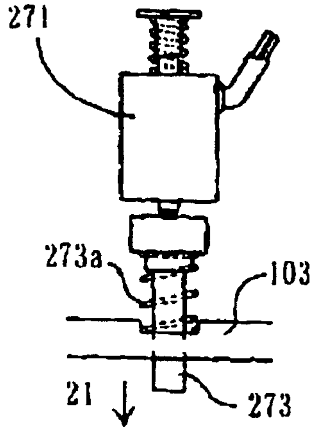
FIG. 6 shows a state in which the battery lock is released by the solenoid according to the second embodiment.
Figure 7:
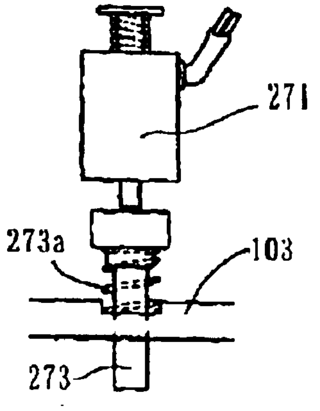
FIG. 7 shows a state in which the lock is locked by the solenoid according to the second embodiment.

A second embodiment of the present invention will now be explained with reference to FIGS. 5 to 7. The second embodiment relates to a modification of the screwdriver 101 as described within the first embodiment with respect to the technique of preventing removal of the battery pack from the body. Therefore, detailed description for components that are substantially the same as in the first embodiment will be abbreviated.

Figure 5:
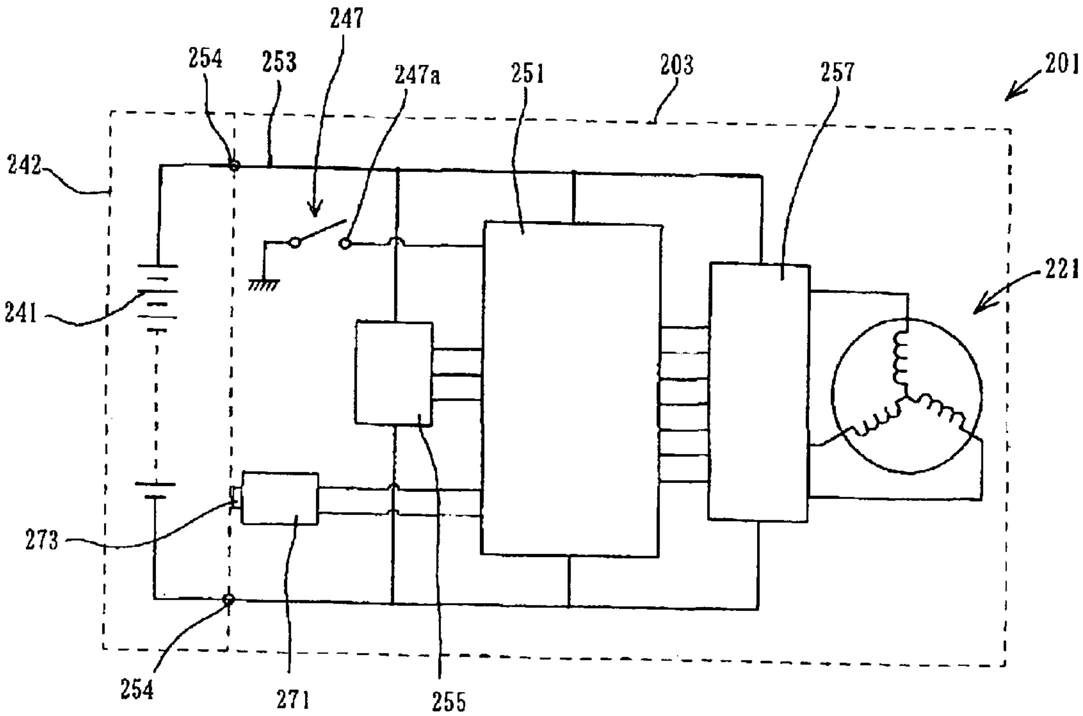
FIG. 5 shows a circuit structure of a screwdriver according to a second embodiment.

FIG. 5 shows a circuit structure of a screwdriver 201 according to the second embodiment. The screwdriver 201 mainly comprises a control circuit 251 to control the operation of a DC brushless motor 221, a power circuit 253 for supplying driving current from a battery 241 to the DC brushless motor 221, a position detecting circuit 255 and an FET bridge 257. These components are disposed within a body 203 having a motor housing and a grip (not particularly shown in the drawings). The battery 241 contained in a battery pack 242 is electrically connected to the power circuit 253 in the body 203 via a connecting terminal 254. The control circuit 251 is a feature that corresponds to the "control device" according to the present invention.

The technique of driving the DC brushless motor 221 via the control circuit 251 and FET bridge 257 and the function of the position detecting circuit 255 in the second embodiment are the same as in the first embodiment, and therefore, their detailed description will be abbreviated.

In this embodiment, a solenoid 271 is further connected to the control circuit 251. The embodiment in the technique of preventing removal of the battery pack from the body. Therefore, detailed description for components that are substantially the same as in the first embodiment will be abbreviated.

Figure 8:
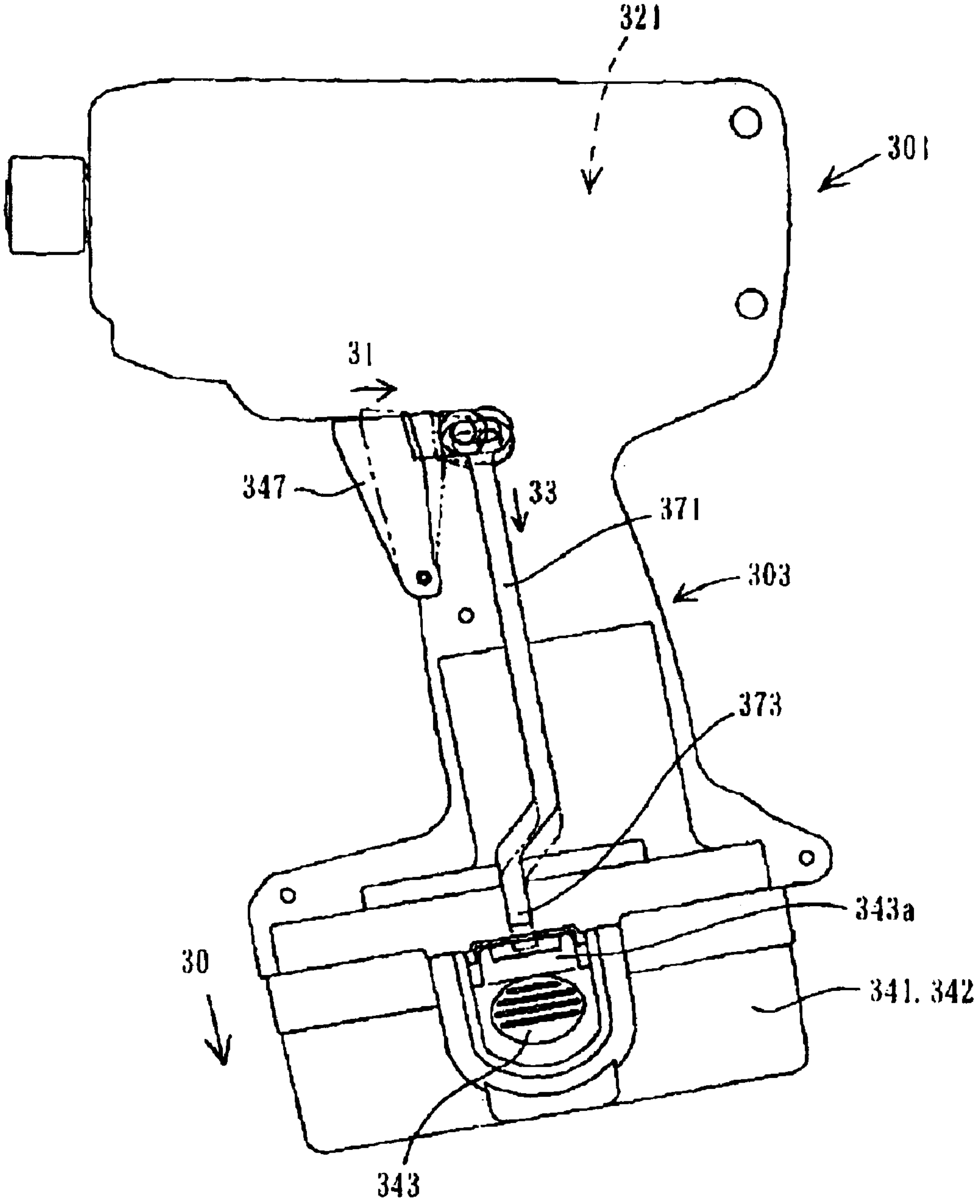
FIG. 8 shows an electric screwdriver according to a third embodiment of the invention.
Figure 9:
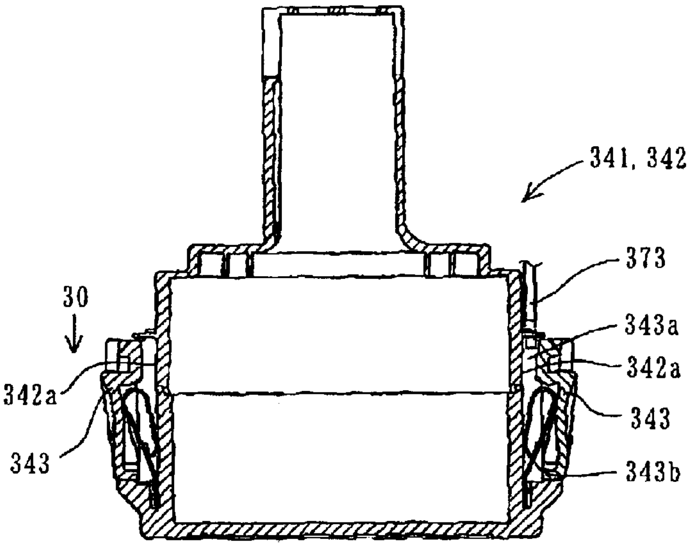
FIG. 9 shows a battery pack utilized within the third embodiment and the mechanism for locking the battery pack and releasing the battery lock.

As shown in FIG. 8, a screwdriver 301 according to the third embodiment uses a hook 343 in order to attach a battery pack 342 to a body 303. According to the third embodiment, a trigger switch interlocking member 371 is coupled to a trigger switch 347 of the screwdriver 301. The lock 373 is provided on the lower end portion of the trigger switch interlocking member 371. As it is shown in FIG. 9, the hook 343 is provided on the both sides of the battery pack 342. Each of the hooks 343 is biased in a direction away from the side surface 342*a* of the battery pack 342 by the biasing force of a hook spring 343*b*. The hook 343, however, can be operated to move toward the side surface 342*a* against the biasing force of a hook spring 343*b*. A hook operating space 343*a* is provided between the hook 343 and the side surface 342*a*. When the hooks 343 are pressed toward the battery pack 342, the hooks 343 move toward the side surface 342*a* within the hook operating space 343*a*. Thus, the battery pack 342 can be removed from the body 303 in the direction shown by arrow 30 (downward as viewed in the drawing).

As it is shown in FIG. 8, when the trigger switch 347 is operated to drive the DC brushless motor 321, the trigger switch 347 turns in the direction as shown by arrow 31 and thus, the trigger switch interlocking member 371 moves in the direction shown by arrow 33. As a result, the lock 373 protrudes toward the battery pack 342 and enters the hook operating space 343*a* while moving downward as shown by broken line. Thus, the lock 373 closes the hook operating space 343*a* and thus obstructs the operation of the hook 343. Therefore, when the trigger switch 347 is operated to drive the DC brushless motor 321, the battery pack 342 is prevented from being removed from the body 303, because the lock 373 enters the hook operating space 343*a* and thus obstructs the operation of the hook 343. As a result, generation of arc is effectively prevented.

On the other hand, when the trigger switch 347 is released to stop the DC brushless motor 321, the trigger switch interlocking member 371 moves the lock 373 out of the hook operating space 343*a* by interlocking with the release of the trigger switch 347. Thus, the operation of the hook 343 is allowed. Therefore, when the trigger switch 347 is operated to stop the DC brushless motor 321, the battery pack 342 can be removed from the body 303 by operating the hook 343 without obstruction of the lock 373.

(Fourth Embodiment)

A fourth embodiment of the present invention will now be explained with reference to FIG. 10. The fourth embodiment relates to modifications to the screwdriver 101 of the first embodiment in the technique of engaging the battery pack on the body and the technique of preventing removal of the battery pack from the body. Therefore, detailed description for components that are substantially the same as in the first embodiment will be abbreviated.

Figure 10:
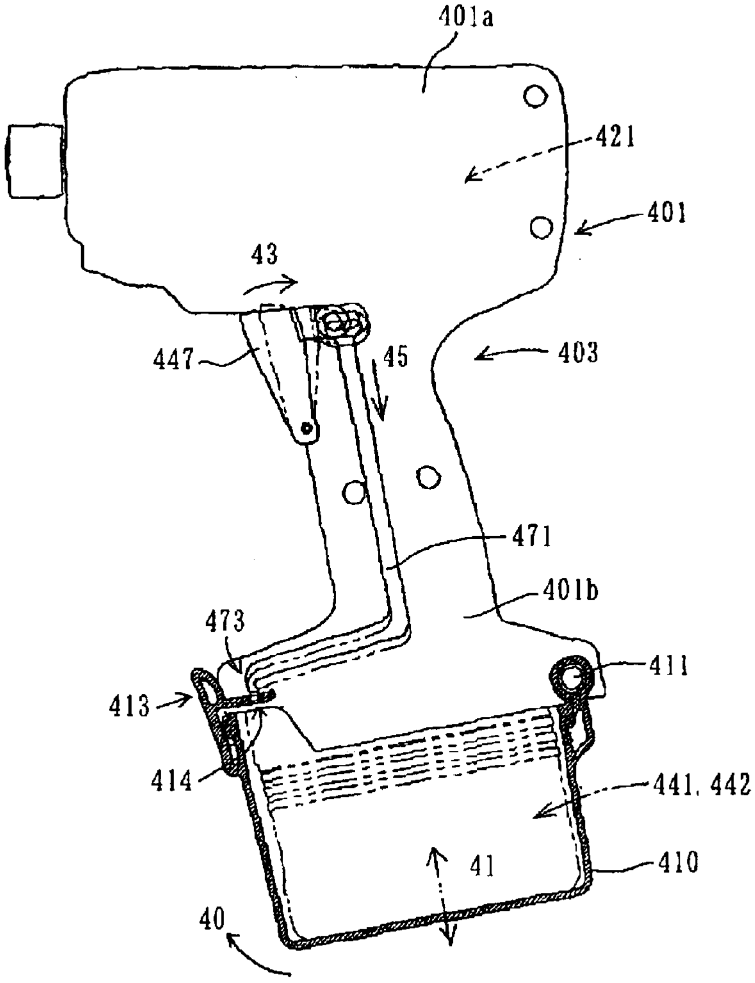
FIG. 10 shows an electric screwdriver according to a fourth embodiment of the invention.

As shown in FIG. 10, according to the fourth embodiment, a battery cover 410 is used to attach the battery pack 442 to the body 403. Specifically, the battery pack 442 and the battery 441 are engaged on the lower end of the grip 401*b* and covered by the battery cover 410 so as to be attached to the body 403.

The battery cover 410 is mounted to the rear end portion of the grip 401*b* and can be rotated about an axis (center of rotation) 411. An engagement member 413 is disposed on the edge end of the battery cover 410 that is opposed to the axis 411 and serves to engage with the body 403 and retain the battery cover 410 onto the body 403. A lock engagement hole 414 for receiving the lock 473 is formed through the engagement member 413. The lock 473 is coupled to the trigger switch 447 via the trigger switch interlocking member 471.

In order to mount the battery pack 442 onto the body 403, the battery pack 442 is set onto the body 403 and then, the battery cover 410 is rotated about the axis 411 in the direction as shown by arrow 40 so as to cover the battery pack 442. Further, the battery cover 410 covering the battery pack 442 is engaged and retained onto the body 403 by means of the engagement member 413. Thus, the battery 441 and the battery pack 442 are reliably attached to the body 403.

When the trigger switch 447 is operated to drive the DC brushless motor 421, the trigger switch 447 turns in the direction shown by arrow 43, and thus the trigger switch interlocking member 471 moves in the direction as shown by arrow 45. As a result, the lock 473 protrudes toward the battery pack 442 and enters the lock engagement hole 414 while moving downward as shown by broken line. Thus, the lock 473 obstructs the operation of the engagement member 413. Therefore, when the trigger switch 447 is operated to drive the DC brushless motor 421, the battery cover 410 is prevented from being opened to remove the battery pack 442 from the body 403, because the lock 473 enters the lock engagement hole 414 and thus, obstructs the operation of the engagement member 413. As a result, generation of arc can be effectively prevented.

On the other hand, when the trigger switch 447 is released to stop the DC brushless motor 421, the trigger switch interlocking member 471 moves the lock 473 out of the lock engagement hole 414 by interlocking with the release of the trigger switch 447. Thus, the operation of the engagement member 413 is allowed. Therefore, when the trigger switch 447 is operated to stop the DC brushless motor 421, the engagement member 413 can be released without obstruction of the lock 473. The battery cover 410 is then rotated to expose the battery pack 442, so that the battery pack 442 can be removed from the body 403. Therefore, according to the fourth embodiment, the battery cover 410 can not be opened to remove the battery pack 442 and the battery 421 from the body 403 unless the trigger switch 447 is released to stop the DC brushless motor 421. As a result, generation of arc, which may be caused by removing the battery 441 during operation of the DC brushless motor 421, can be reliably prevented. Further, according to the fourth embodiment, not the battery pack 442 but the engagement member 413 of the battery cover 410 is locked by interlocking with the operation of the trigger switch 447. Therefore, it is not necessary to provide a special design structure in the battery pack 442 to receive the lock 442. Thus, known battery pack can be used as the battery pack 442 as such. Further, the battery 441 can be prevented from being removed during operation of the DC brushless motor 421, so that generation of arc can be reliably prevented. Thus, the freedom in designing the screwdriver 401 is increased.

As a modification to the fourth embodiment, an adapter may be adapted and arranged between the battery pack 442 and the body 403 (grip 401*b*). In such modification, it may be configured that only when the DC brushless motor 421 is stopped, the lock of the adapter can be released and thus, the battery pack 442 and the battery 421 can be removed from the body 403. Thus, generation of arc can be securely prevented.

In addition or alternatively, a lock-dial type hook or other similar means may be provided which engages and retains the battery pack 442 onto the body 403 (grip 401*b*). In such a case, it may be configured such that the operation of the lock dial can be locked. Only when the DC brushless motor 421 is stopped, the lock dial can be released and the battery pack 442 and the battery 421 can be removed from the body 403. Thus, generation of arc can be securely prevented.

Further, in order to lock or release the engagement member 413 in the fourth embodiment, a solenoid may be used as in the second embodiment instead of using the trigger switch interlocking member 471 that mechanically transmits the movement of the trigger switch 447.

In the above-mentioned embodiments, any type of motor other than a DC brushless motor may be used to drive the driver bit. The present teachings can be applied not only to the screwdrivers but also broadly to any other battery-type power tools.

Further, the first and the second embodiments in which the battery pack itself is engaged by the lock, the third embodiment in which the operation of the hook for engaging the battery pack on the body is controlled, and the fourth embodiment in which the opening and closing of the battery cover is controlled may be combined entirely or in part.

The specification incorporates by reference the disclosure of Japanese priority document of Japanese patent application JP 2002-126908 filed on Apr. 26, 2002 before the Japanese patent and the disclosure of U.S. patent application Ser. No. 10/386,876 filed on Mar. 12, 2003 before the USPTO.

What is claimed is:

1. A power tool comprising:

a motor that drives a tool bit, a body that houses the motor, a battery detachably coupled to the body, wherein the battery supplies driving current to operate the motor, and a battery removal preventing device that prevents the battery from being removed from the body during operation of the motor and allows the battery to be removed from the body only when the motor is stopped, said battery removal preventing device automatically engaging when the motor is being driven and automatically disengaging when the motor is no longer driven.

2. The power tool as defined in claim 1, wherein the battery removal preventing device includes a battery lock that detachably locks the battery to the body, the battery lock being adapted to lock the battery to the body when the motor is started and to release the engagement between the battery and the body only when the motor is stopped.

3. The power tool as defined in claim 1, further comprising a trigger switch that is operated to start and stop the motor, wherein the battery removal preventing device includes a battery lock to removably lock the battery to the body and a trigger switch interlocking member that transmits the operational movement of the trigger switch to the battery lock so as to operate the battery lock, the battery lock being adapted to lock the battery to the body via the trigger switch interlocking member when the trigger switch is operated to start the motor and to release the engagement between the battery and the body via the trigger switch interlocking member only when the trigger switch is operated to stop the motor.

4. The power tool as defined in claim 1, wherein the battery removal preventing device includes a battery lock to removably lock the battery to the body and a control device that outputs a lock signal and/or a lock release signal to the battery lock in accordance with the operating state of the motor, the battery lock being adapted to lock the battery to the body based on the lock signal outputted from the control device when the motor is started and to release the engagement between the battery and the body based on the lock release signal outputted from the control device only when the motor is stopped.

5. The power tool as defined in claim 1, further comprising a power circuit that provides driving current from the battery to the motor, a trigger switch that is electrically connected to a control circuit of the power tool independently of the power circuit, the trigger switch being operated to start and stop the motor, wherein the battery removal preventing device includes a battery lock to removably lock the battery to the body and a trigger switch interlocking member that transmits the operational movement of the trigger switch to the battery lock so as to operate the battery lock, the battery lock being adapted to lock the battery to the body via the trigger switch interlocking member when the trigger switch is operated to start the motor and to release the engagement between the battery and the body via the trigger switch interlocking member only when the trigger switch is operated to stop the motor.

6. A power tool comprising:

a motor that drives a tool bit, a body that houses the motor, a battery detachably coupled to the body, wherein the battery supplies driving current to operate the motor, an attaching device that removably attaches the battery to the body and a battery removal preventing device, wherein the battery removal preventing device automatically prevents the battery from being released from the attaching device when the motor is started and automatically allows the battery to be released from the attaching device when the motor is stopped.

7. The power tool as defined in claim 6, wherein the attaching device is defined by a battery cover to cover the battery on the body.

8. The power tool as defined in claim 6, wherein the attaching device is defined by a battery cover to cover the battery on the body and the attaching of the battery to the body is released by releasing the engagement of the battery cover on the body.

9. The power tool as defined in claim 6, wherein the attaching device is defined by a battery cover rotatably coupled to the body so as to cover the battery on the body.

10. The power tool as defined in claim 6, wherein the attaching device is defined by a lock-dial type hook to lock the battery to the body.

11. The power tool as defined in claim 6, wherein the attaching device is defined by an adapter disposed between the battery and the body.

12. A method of using a power tool wherein the power tool includes a motor that drives a tool bit, a body that houses the motor, a battery detachably coupled to the body, wherein the battery supplies driving current to operate the motor, comprising:

automatically preventing the battery from being removed from the body when the motor is being driven and automatically allowing the battery to be removed from the body only when the motor is not being driven.

13. A power tool comprising:

a motor that drives a tool bit, a body that houses the motor, a battery detachably coupled to the body, wherein the battery supplies driving current to operate the motor, and means for automatically preventing the battery from being removed from the body while the motor is being driven and automatically allowing the battery to be removed from the body only when the motor is not being driven.

14. The power tool as defined in claim 13, wherein the battery removal preventing means includes means for detachably locking the battery to the body, the battery locking means being adapted to lock the battery to the body when the motor is started and to release the engagement between the battery and the body only when the motor is stopped.

15. The power tool as defined in claim 13, wherein the battery removal preventing means includes means for locking the battery to the body and controlling means for outputting a lock signal and/or a lock release signal to the battery lock according to the operating state of the motor, the battery locking means being adapted to lock the battery to the body based on the lock signal outputted from the controlling means when the motor is started and to release the engagement between the battery and the body based on the lock release signal outputted from the controlling means only when the motor is stopped.

16. A power tool comprising:

a motor that drives a tool bit, a body that houses the motor, a battery detachably coupled to the body, wherein the battery supplies driving current to operate the motor, a trigger switch that is operated to start and stop the motor, a battery lock that removably locks the battery to the body and a trigger switch interlocking member that transmits the operational movement of the trigger switch to the battery lock so as to operate the battery lock, wherein the battery lock is adapted to lock the battery to the body via the trigger switch interlocking member when the trigger switch is operated to start the motor and to release the battery lock between the battery and the body via the trigger switch interlocking member only when the trigger switch is operated to stop the motor.

17. A power tool comprising:

a motor that drives a tool bit, a body that houses the motor, a battery detachably coupled to the body, wherein the battery supplies driving current to operate the motor, a battery lock to removably lock the battery to the body a control device that outputs a lock signal and a lock release signal to the battery lock in accordance with the operating state of the motor, wherein the battery lock is adapted to lock the battery to the body based on the lock signal outputted from the control device when the motor is started and to release the engagement between the battery and the body based on the lock release signal outputted from the control device only when the motor is stopped.

18. A power tool comprising:

a motor that drives a tool bit, a body that houses the motor, a battery detachably coupled to the body, wherein the battery supplies driving current to operate the motor, a power circuit that provides driving current from the battery to the motor, a trigger switch that is electrically connected to a control circuit of the power tool independently of the power circuit, wherein the trigger switch is operated to start and stop the motor, a battery lock that removably locks the battery to the body and a trigger switch interlocking member that transmits the operational movement of the trigger switch to the battery lock so as to operate the battery lock, wherein the battery lock is adapted to lock the battery to the body via the trigger switch interlocking member when the trigger switch is operated to start the motor and to release the lock between the battery and the body via the trigger switch interlocking member only when the trigger switch is operated to stop the motor.

19. A power tool comprising:

a motor that drives a tool bit, a body that houses the motor, a battery detachably coupled to the body, wherein the battery supplies driving current to operate the motor, a battery removal preventing device that prevents the battery from being removed from the body during operation of the motor and allows the battery to be removed from the body only when the motor is stopped, and a trigger switch that is operated to start and stop the motor, wherein the battery removal preventing device includes a battery lock to removably lock the battery to the body and a trigger switch interlocking member that transmits the operational movement of the trigger switch to the battery lock so as to operate the battery lock, the battery lock being adapted to lock the battery to the body via the trigger switch interlocking member when the trigger switch is operated to start the motor and to release the engagement between the battery and the body via the trigger switch interlocking member only when the trigger switch is operated to stop the motor.

20. A power tool comprising:

a motor that drives a tool bit, a body that houses the motor, a battery detachably coupled to the body, wherein the battery supplies driving current to operate the motor, a battery removal preventing device that prevents the battery from being removed from the body during operation of the motor and allows the battery to be removed from the body only when the motor is stopped, wherein the battery removal preventing device includes a battery lock to removably lock the battery to the body and a control device that outputs a lock signal and/or a lock release signal to the battery lock in accordance with the operating state of the motor, the battery lock being adapted to lock the battery to the body based on the lock signal outputted from the control device when the motor is started and to release the engagement between the battery and the body based on the lock release signal outputted from the control device only when the motor is stopped.

21. A power tool comprising:

a motor that drives a tool bit, a body that houses the motor, a battery detachably coupled to the body, wherein the battery supplies driving current to operate the motor, a battery removal preventing device that prevents the battery from being removed from the body during operation of the motor and allows the battery to be removed from the body only when the motor is stopped, and a power circuit that provides driving current from the battery to the motor, a trigger switch that is electrically connected to a control circuit of the power tool independently of the power circuit, the trigger switch being operated to start and stop the motor, wherein the battery removal preventing device includes a battery lock to removably lock the battery to the body and a trigger switch interlocking member that transmits the operational movement of the trigger switch to the battery lock so as to operate the battery lock, the battery lock being adapted to lock the battery to the body via the trigger switch interlocking member when the trigger switch is operated to start the motor and to release the engagement between the battery and the body via the trigger switch interlocking member only when the trigger switch is operated to stop the motor.

22. A power tool comprising:

a motor that drives a tool bit, a body that houses the motor, a battery detachably coupled to the body, wherein the battery supplies driving current to operate the motor, and means for preventing the battery from being removed from the body during operation of-the motor while allowing the battery to be removed from the body only when the motor is stopped, wherein the battery removal preventing means includes means for locking the battery to the body and controlling means for outputting a lock signal and/or a lock release signal to the battery lock according to the operating state of the motor, the battery locking means being adapted to lock the battery to the body based on the lock signal outputted from the controlling means when the motor is started and to release the engagement between the battery and the body based on the lock release signal outputted from the controlling means only when the motor is stopped.

* * * * *